UNITED STATES PATENT OFFICE.

ARVID NILSON, OF CHICAGO, ILLINOIS.

YEAST EXTRACT AND PROCESS OF MANUFACTURING THE SAME.

1,200,011.     Specification of Letters Patent.     Patented Oct. 3, 1916.

No Drawing.     Application filed June 12, 1916. Serial No. 103,185.

*To all whom it may concern:*

Be it known that I, ARVID NILSON, a subject of the King of Sweden, residing at Chicago, in the county of Cook and State of Illinois, have invented a new and useful Improvement in Yeast Extract and Processes of Manufacturing the Same, of which the following is a specification.

My invention relates to an improved process of extracting the contents of the cells of yeast, and especially brewers' yeast to produce an improved palatable and nutritious article of food.

The primary object of my present improvement is to enable the extract to be produced uniformly without the bitter taste, due to the hop-resins in the yeast treated, or to other cause.

The present invention is to be distinguished from a process known to me of making a yeast extract, involving the treatment of brewers' yeast, with an alkaline solution, in which the resinous bitter substances are readily soluble and are removed by filtration and by washing the yeast, after which the latter is boiled in water to rupture the cells and extract their contents. This method is not uniformly successful, however, particularly when, as is more or less liable to be the case, the yeast treated contains dead cells, because such cells absorb the bitter alkaline solution, which is retained in them until the yeast is boiled, and the boiling brings this bitter principle into the extract and renders it unpalatable. Furthermore, the alkaline solution and subsequent washing treatment rob the yeast of some of its valuable soluble substances, and particularly of the valuable mineral substances, thereby lessening the yield of extract and robbing it of much of its nutritive value. By my improved process, these bitter substances, instead of being brought into solution, are kept in an insoluble state from the beginning of the treatment, hereinafter described, and are thus prevented from ever entering into the solution employed, and besides, substantially all of the acid-soluble albuminoids and of the acid-soluble mineral substance are retained.

For the practice of my improved process, I take advantage of the property of the hop resins in the yeast of being insoluble in mineral acids; the preferred procedure in detail being the following: Before treating the yeast to obtain the extract, the yeast should be passed through a fine-mesh sieve to remove, as far as possible, resinous lumps, hop-leaves and other undesirable matter. The yeast is then thoroughly stirred, in a suitable receptacle, in a dilute mineral acid. Dilute hydrochloric acid is preferred for the purpose, of the strength of about 1 part of the concentrated acid to about 400 parts of water, using more or less of this acidulated liquid according to the condition of the yeast, meaning its more or less "dry" condition. When any lumps, which the yeast may contain, have thus been broken up, the mixture is heated sufficiently to rupture the cells and extract their soluble constituents. The temperature for this purpose may be about 170° F. to 200° F., more or less, though it must be below the boiling point of water; in fact it is desirable to keep the temperature as low as it is possible to have it to effect the requisite rupturing of the yeast-cells, and about 170° F. is suitable and preferred for the purpose. The yeast need not remain under subjection to this temperature, to accomplish the aforesaid purpose, for a period in excess of about thirty minutes. Thereupon, the solution is separated from the insoluble part of the yeast by filtration or sedimentation. The resulting filtrate or product is heated to about 170° F. to 200° F., more or less, and while in the heated condition the hydrochloric acid is neutralized by the addition of a suitable alkali. The alkali preferably used is sodium carbonate, which combines with the acid and produces sodium chlorid. A precipitate (mostly albuminoids) is caused by this neutralization of the acid and may be filtered off. The resultant clear liquid, though usable in that condition, is preferably evaporated to a desired degree of concentration; and sufficient table salt may, in the meantime, be added for seasoning and to act preservatively on the finished product. The acid solution, in which the yeast is thus heated or boiled, prevents the hop-resins in the yeast from getting into the solution, and by the filtration the hop-resin is excluded from the filtrate, which is drawn off and forms the extract, to be condensed, or not. No washing of the yeast with water is required, as in the alkali treatment referred to, for removing remnants of the alkaline solution; and my improved process produces a greater yield of extract from the yeast treated, because it extracts the contents of the yeast-cells without any leaching with an alkaline solution preceding such washing.

What I claim as new and desire to secure by Letters Patent is—

1. The process which consists in mixing yeast with a dilute mineral acid, heating the mixture to a temperature below that of the boiling point of water that will effect rupture of the yeast-cells and extraction of their soluble constituents in substantially unchanged chemical condition, withdrawing the resultant solution, and neutralizing the acid.

2. The process which consists in mixing yeast with dilute hydrochloric acid, heating the mixture to a temperature below that of the boiling point of water that will effect rupture of the yeast-cells and extraction of their soluble constituents in substantially unchanged chemical condition, withdrawing the resultant solution, and neutralizing the acid.

3. The process which consists in mixing yeast with dilute mineral acid, heating the mixture and thereby rupturing the yeast-cells to extract their soluble constituents, withdrawing the resultant solution, heating the acidulated product and treating it with an alkali to neutralize the acid.

4. The process which consists in mixing yeast with dilute hydrochloric acid, heating the mixture and thereby rupturing the yeast-cells to extract their soluble constituents, withdrawing the resultant solution, heating the acidulated product, and adding thereto sodium carbonate to neutralize the acid.

5. The process which consists in mixing yeast with dilute hydrochloric acid, heating the mixture and thereby rupturing the yeast-cells to extract their soluble constituents, withdrawing the resultant solution, heating the acidulated product and adding thereto sodium carbonate to neutralize the acid, and condensing the resultant product.

6. The process which consists in mixing yeast with dilute hydrochloric acid, heating the mixture and thereby rupturing the yeast-cells to extract their soluble constituents, withdrawing the resultant solution, heating the acidulated product and adding thereto sodium carbonate to neutralize the acid, and adding salt.

7. The process which consists in mixing yeast with dilute hydrochloric acid, heating the mixture and thereby rupturing the yeast-cells to extract their soluble constituents, withdrawing the resultant solution, heating the acidulated product and adding thereto sodium carbonate to neutralize the acid, filtering off the resultant precipitate, concentrating the liquid filtrate and adding salt.

8. A hydrochloric-acid-extracted yeast-extract containing the soluble constituents of the yeast including substantially all of the mineral substances in substantially unchanged chemical condition, and having the acid-content neutralized into sodium chlorid.

ARVID NILSON.

In presence of—
 NELLIE B. DEARBORN,
 K. A. O'NEILL.